United States Patent Office 2,787,281
Patented Apr. 2, 1957

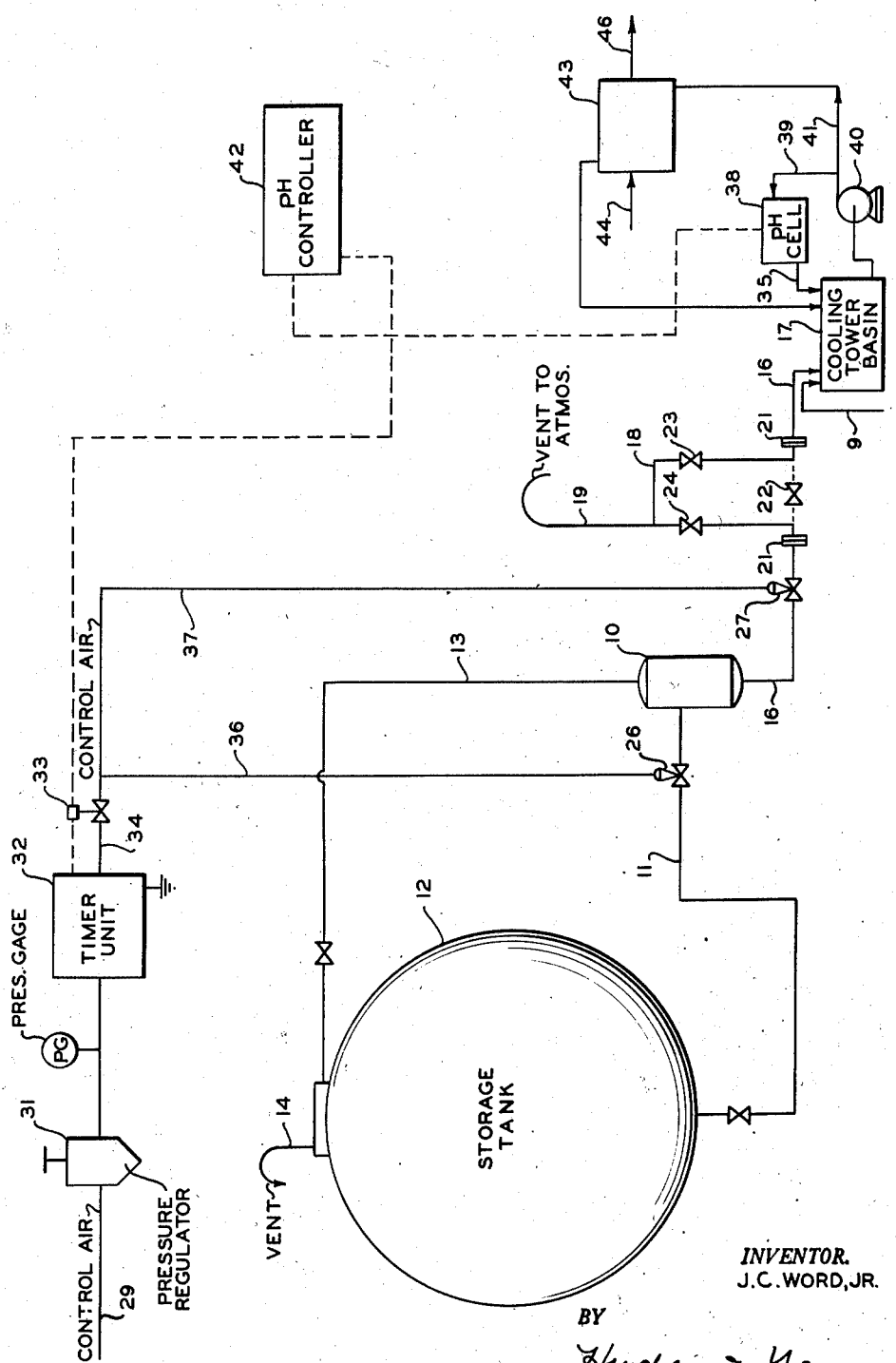

2,787,281

PROPORTIONING OF FLUIDS

James C. Word, Jr., Borger, Tex., assignor to Phillips Petroleum Company, a corporation of Delaware Application March 25, 1953, Serial No. 344,528

10 Claims. (Cl. 137—93)

This invention relates to proportioning of fluids. In one aspect this invention relates to the regulation of varying pH of a liquid. In another aspect this invention relates to apparatus for regulating varying pH of a liquid, to a value within a predetermined range. In still another aspect this invention relates to apparatus for intermittently gravitating measured portions of a first liquid into admixture with a second liquid. In still another aspect this invention relates to apparatus for proportioning a liquid of selected acidity or alkalinity into admixture with a liquid of different acidity or alkalinity and of varying pH, to regulate the pH of the second liquid to a value within a predetermined range. In still another aspect this invention relates to the regulation of pH of water employed under conditions causing its pH to continuously increase, to a value within a predetermined range.

In accordance with my invention, I have provided apparatus for proportioning a fluid into admixture with another fluid, e. g., controlling the volume of fluid charged to its utilization, comprising steps of gravitating such a fluid to a zone of predetermined volume and thereafter terminating fluid gravitation to said zone and then gravitating fluid in said predetermined volume from said zone to its utilization; and then repeating the said gravitation of fluid to and from said zone in the sequence described, and maintaining the resulting intermittent flow of fluid into and from said zone in accordance with a predetermined time cycle. In accordance with a narrower concept of my invention, I have provided for regulation of pH of a fluid, of varying pH, to a value within a predetermined range, by intermittently measuring and gravitating predetermined portions of a first fluid, into admixture with the said fluid of varying pH, i. e., the second fluid, the first fluid in admixture with the second fluid causing a change in pH of the second fluid to regulate the latter pH, and the said measured portions intermittently admixed with the second fluid being sufficiently large so as to cause direction of the said pH, to a value at least within the said predetermined range, and, continuously measuring pH of the said second fluid and terminating the intermittent gravitational flow of first fluid, in response to a resulting change in pH of the second fluid to a directed value outside the said predetermined range.

In one form of my invention, an apparatus is provided for regulating pH of water to within a predetermined range while it is being employed under conditions ordinarily causing its pH to gradually increase to a value beyond such predetermined range, as for example a pH range of 2.5–6, more often about 3.5–4.5, by intermittently measuring and gravitating predetermined portions of an acid having an acidity higher than that of the said water into admixture with the water, thereby causing the pH of the water to decrease, the said measured portions of acid being those required to cause direction of the water pH to a value at least within the said range, and, continuously measuring pH of the said water and terminating the said intermittent flow of acid to water in response to any decrease in the water pH to a value below the predetermined range.

In another form of my invention I have provided apparatus comprising a first chamber, i.e., an open or closed vessel; a first conduit communicating with the interior of said first chamber; a second chamber, i. e., an open or closed vessel, disposed to receive gravitational fluid flow from the said first chamber; a second conduit communicating with the interior of said first chamber and of said second chamber; a first automatically actuated valve in the said first conduit and a second automatically actuated valve in the said second conduit, one of the said first and second valves being adapted to be closed when the other is open; means for communicating power to said first and second valves to automatically actuate those valves; and timing means operatively connected with the said power communicating means so as to intermittently terminate and admit access of said power to said first and second valves.

In still another form of my invention I have provided apparatus comprising a first chamber, i. e., an open or closed vessel; a first conduit communicating with the interior of said first chamber; a second chamber, i. e., an open or closed vessel, disposed to receive gravitational fluid flow from the said first chamber; a second conduit communicating with the interior of said first chamber and of said second chamber; a first automatically actuated valve in the said first conduit and a second automatically actuated valve in the said second conduit, one of the said first and second valves being adapted to be closed when the other is open; means for communicating power to said first and second valves to automatically actuate those valves; timing means operatively connected with the said power communicating means so as to intermittently terminate and admit access of said power to said first and second valves; continuous pH measuring means in communication with the interior of said second chamber; control means actuated by said pH measuring means and operatively connected with said power communicating means to control access of said power to said first and second valves in response to actuation by said pH measuring means.

In still another form of this invention, I have provided apparatus, i. e., an adjustable loop outlet, referred to also as a variable control loop, for regulating the effective volume of the said first chamber described immediately hereinabove whereby in proportioning liquids from the said first chamber, the volume of fluid intermittently gravitated therefrom can be quickly adjusted to any desired volume less than that of the said first chamber; such a change in volume being often desirable because of changing requirements for the quantity of gravitated liquid during its utilization. The adjustable loop outlet comprises at least a portion of the said second conduit, and is shaped in form of an inverted U, and is rotatable about its laterally extending axis, i. e., passing through the lowermost point of the said inverted U, and includes a vent conduit in its upper wall portion to prevent siphoning of fluid from the first chamber after the liquid level in the said first chamber has become equal to the height of the said inverted U.

Reference is made to the attached drawing, which is a diagrammatical illustration of apparatus provided by my invention as specifically applied to the control of pH of water being continuously circulated as cooling water in a heat exchanger, e. g., a cooling tower. In such a heat exchange process the pH of the cooling water circulated should be in the range of about 3 to 7, preferably about 3.5 to 4.5, but ordinarily increases to a value beyond such range. Although pH of such cooling water within a range of about 2.5 to 7 is generally suitable, pH outside that range is not desirable because at a pH above that range, formation and precipitation of scale upon the inner walls of the exchange system occurs with accompanying lowered efficiency of the heat exchange process and at a pH below that range corrosive effects of the cooling water on the heat exchange equipment are unduly high. However, when using the acid in conjunction with certain known water treating agents designed to reduce sulfate deposition and scale formation, and which agents also contain corrosion inhibiting factors, such as, e. g., the phosphate-cyanide compositions disclosed in U. S. 2,515,529, it is preferable to maintain the pH at a value in the range from 5.0 to 6.8 as is well known in the art.

Referring to the figure, measuring chamber 10 is disposed in relation to chemical storage tank 12 so as to receive gravitational flow of fluid from tank 12 through conduit 11 communicating with the interior of chamber 10. Chamber 12 is vented through conduit 14 and chamber 10 is vented through conduits 13 and 14, to the atmosphere. Cooling tower basin, or chamber 17, is disposed in relation to chamber 10 so as to receive gravitational fluid flow from chamber 10 through conduit 16 communicating with the interior of chamber 10 and with the interior of basin 17, conduit 16 being capable of conducting gravitational fluid flow from chamber 10 at all times. In one form of this invention, variable control loop 18 including vent 19, forms a part of conduit 16 and is shaped as an inverted U, and is connected in line 16 by conventional unions 21. Thus conduit 16 is inclusive, or exclusive, as desired, of loop 18. Loop 18 can be built into conduit 16 and be maintained in or out of the system by operation of valves 22, 23 and 24. Loop 18 by virtue of its support by unions 21 can be rotated about its axis laterally extending through its lowermost points, i. e., the axis represented by a line connecting unions 21, which as illustrated is the horizontal axis of the said loop 18. Motor valve 26 in conduit 11 and motor valve 27 in conduit 16 are preferably diaphragm motor valves operated in response to air pressure supplied from line 29 via pressure regulator 31, timer unit 32, and valve 33, these latter two elements being discussed in more detail hereinafter. Motor valves 26 and 27 are opposite acting valves, i. e., one of which is adapted to be open when the other is closed. Thus in response to air pressure supplied to motor valves 26 and 27, valve 26 is open and valve 27 is closed, or vice versa, as desired. pH measuring means 38, such as a pH cell of conventional design connected via line 39 with discharge line 41 and pump 40, of basin 17, is thereby maintained in communication with the interior of basin 17 and continuously measures pH of water discharged from basin 17, the water discharged from element 38 being returned via line 35 into basin 17 for circulation through the system. pH measuring means 38 is operatively connected with controller 42 so that it is actuated by measuring means 38 in response to pH of the fluid passed through pH cell 38 to cause valve 33 in line 34 to open or close in response to the said actuation by pH measuring means 38. In the presently illustrated embodiment, pH controller 42, which is operatively connected with valve 33 in the air pressure line 29, causes the said valve 33 to move into a closed position in response to actuation by pH cell 38, as a result of response of the latter to measurement of pH in the liquid flowing therethrough at a value below the predetermined pH range which in the illustrated embodiment is a value below a pH of about 2.5. When thus operating, controller 42 terminates or intercepts the communication of air pressure with valves 26 and 27. Controller means 42 is a controller of conventional design and is available on the open market. Valve 33 is preferably an electric solenoid type valve. Timer unit 32 can be any conventional timer device or time cycle controller available on the open market for regulating sequence and duration of varying operations in industrial process work, as for example, the Taylor-Flex-O-Timer manufactured by the Taylor Instrument Company. Timer unit 32 can be operatively connected with valve 33 to intermittently open and close same or can be connected with a separate valve in line 34 (not shown) to intermittently open and close same, as desired.

pH measuring means 38 can comprise a glass electrode and a calomel electrode which communicate with the pH controller 42, and, pH controller 42 can be any instrument which is responsive to pH measured by a pH measuring means, and which thus responsively actuates means to operate control valves, generally external to the controller system. Controller means such as pH controller 42 and pH measuring means such as cell 38 are available commercially, as for example from Minneapolis-Honeywell Regulator Company.

In the operation of apparatus illustrated by way of the drawing, as applied to a specific embodiment referred to hereinabove, pH of water continuously circulated as cooling water through a heat exchange system, such as a cooling tower, is regulated to a value within a range generally above about 2.5, and generally not above about 7, without which regulation the said pH will increase to an unduly high value with the resulting undesirable effects described hereinabove. pH of water in basin 17 is maintained in the desired range by intermittently passing measured volumes of an acid, such as sulfuric acid, from tank 12 into basin 17 in such a manner that the volume of introduced acid and the frequency of its introduction into basin 17 will be that required to maintain the desired pH range of the circulating water. It is important that the amount of acid so introduced into basin 17 will be sufficiently great to direct the pH value of the water into the desired range, i. e., will not be so slight as to permit the pH value of the water to increase beyond the desired range even while acid is being intermittently introduced to the system. Thus, during normal operation of the illustrated embodiment, acid is gravitated from tank 12 and line 11 to motor valve 26, which if open permits gravitation of acid into measuring chamber 10 in which event motor valve 27 is closed and prevents flow of acid through line 16 to basin 17. However, if desired, gravitation of acid or of any fluid, through line 11, can be substituted by any desired means, such as by pumping (not shown) the flow of fluid into chamber 10 being controlled by opposite acting valves 26 and 27 as described herein. Timer 32 is set to intermittently open and close a valve in line 34, diagrammatically illustrated as valve 33, which can be the same valve operatively connected with pH controller 42 or a different valve, in any event thereby causing air pressure to be alternately applied to valves 26 and 27, and terminated, thus causing on one cycle, valve 26 to be open while valve 27 is closed during which time gravitational flow of acid from tank 12 to chamber 10 takes place and on the succeeding cycle causing valve 26 to close and valve 27 to open, thus providing for gravitational flow of the predetermined measured amount of acid from chamber 10 to basin 17.

Over a given period of time the rate of change in pH of the circulating cooling water may vary such that its regulation may be more accurately carried out by altering the effective volume of chamber 10 so as to increase or decrease the amount of acid intermittently gravitated through line 16 to basin 17. The effective volume of chamber 10 can be altered by rotating variable control loop 18 to a predetermined point about its horizontal axis by virtue of loop 18 functioning as a barometric leg of chamber 10 and thus preventing gravitational flow of acid from that portion of chamber 10 extending to a vertical height the same as that of loop 18. No siphoning effect of lop 18 is possible by virtue of vent line 19 which is of sufficient height that there can be no flow of liquid through it.

Acid gravitated from chamber 10 via line 16 into basin 17 is mixed in basin 17 with water to be circulated as coolant via pump 40 and line 41 to a heat exchanger system 43, and return via line 47 to basin 17. Material to be cooled in heat exchanger 43 is admitted through line 44 and discharged through line 46. Raw make-up water is added to basin 17 via line 9.

Although pH of water in basin 17 is normally controlled to within the desired range by intermittent introduction thereinto of a predetermined volume of acid from line 16, the rate of change of pH of water circulating through heat exchanger 43 will at times vary to an extent that the measured amount of acid normally admitted to chamber 17 is more than necessary for regulation of the water pH within the desired range, and consequently the pH falls to a value below the intended range, which is undesirable from the standpoint of unduly high corrosive effects of the higher pH water, i. e., the effect of its relatively high acidity on the heat exchange equipment. Such excess introduction of acid to basin 17 is prevented by continuously measuring pH of water in basin 17 by circulating a side stream from discharge line 41 through pH cell 38, which is set to actuate controller 42, when the pH of water from basin 17 falls to below the predetermined minimum, generally about 2.5, and by cutting off air pressure supply to valves 26 and 27 by virtue of controller 42 actuated by cell 38, causing valve 33 to close. If pH of water in basin 17 increases to a value above the desired range, the effective volume of chamber 10 can be increased by proper rotation of loop 18 about it horizontal axis and/or by increase in the time cycle of air supply to valves 26 and 27.

Thus, as illustrated, I have provided apparatus for gravitationally proportioning acid or other difficultly handled liquids to any utilization, and as applied to the regulation of pH of a liquid, my invention provides for effecting the said proportioning in response to a predetermined change in pH of that liquid. Thus my invention provides for gravitational proportioning of liquids for any utilization, whether or not in response to a pH change, and is advantageously applied to proportioning of strong bases with water or other fluids, to proportioning fluid chemicals to boiler water, to adding predetermined quantities of tetraethyl lead to a predetermined quantity of gasoline, to adding predetermined quantities of dye solutions to predetermined quantities of gasolines, diesel fuels, and the like. My invention eliminates the requirement for a level control upstream from and/or in the measuring chamber. The apparatus of my invention is not effected by varying level in the supply tank (12), it only being required that a sufficient amount of acid is present in the said tank for supply to the measuring chamber 10.

As discussed hereinabove, valves 26 and 27 are preferably diaphragm motor valves operated in response to air pressure as illustrated. However, it is to be understood that valves 26 and 27 can be automatically actuated valves of any type. In that event, timer unit 32 adapted to intermittently terminate and admit access of power to valves 26 and 27, as for example to operate a switch terminating flow of electric power to valves 26 and 27 as solenoid valves. Similarly valve 33 operatively connected with controller 42 can be any type of automatically actuated valve such as a diaphragm motor valve operated by air pressure when pH controller 42 is adapted to control supply of air pressure to valve 33. Other modifications so far as types of valves 33, 26 and 27 are concerned, together with adaptation of timer unit 32 and pH controller 42 to the operation of these valves in accordance with this invention is within the scope of this invention.

As illustrated, a single valve 33 is shown in the air pressure supply line 29 (and 34) and it is within the scope of this invention that such a single valve 33 be operated in response to both timer unit 32 and pH controller 42, although separate valves can be employed, i. e., a separate valve operated in response to timer unit 32 and a different and separate valve operated responsive to pH controller 42.

Reasonable variation and modification are possible within the scope of the foregoing disclosure, drawing and appended claims to the invention, the essence of which is apparatus for proportioning flow of fluid to a utilization, comprising gravitating such a fluid to a zone of predetermined volume and thereafter terminating fluid gravitation to said zone and gravitating fluid in said predetermined volume from said zone to the said utilization, and then repeating the said gravitation of fluid to and from said zone in the sequence described, and, maintaining the resulting intermittent flow of fluid into and from the said zone in accordance with a predetermined time cycle; this invention in accordance with a narrower concept providing for regulation of pH of a fluid, of varying pH to a value within a predetermined range, by intermittently measuring and gravitating predetermined portions of a first fluid, into admixture with the said fluid of varying pH, i. e., the second fluid, the first fluid in admixture with the second fluid causing a change in pH of the second fluid to regulate the latter pH, and the said measured portions intermittently admixed with the second fluid being sufficiently large so as to cause direction of the said pH, to a value at least within the said predetermined range, and, continuously measuring pH of the said second fluid and terminating the intermittent gravitational flow of first fluid, in response to a resulting change in pH of the second fluid to a directed value outside the said predetermined range.

Raw water used as makeup water for heat exchange systems, such as that introduced into basin 17 via line 9, normally contains such anions as bicarbonate, sulfate, and chloride along with such cations as iron, calcium, magnesium, and sodium. The calcium, iron, and magnesium components along with the bicarbonate and sulfate components tend to form deposits or scales in the heat exchange system. In order to decrease the scale forming tendencies, an acid such as sulfuric acid is added to the water to eliminate, at least in part, the bicarbonate anion substituting therefor a sulfate anion. However, calcium sulfate is also a scale forming material and an additional chemical treatment is usually required, such as the phosphate-cyanide compositions mentioned hereinabove. These last-mentioned compositions inhibit corrosion of the heat exchange system parts and also alleviate the formation of scales and deposits thereon, and are often maintained in the cooling water to which acid flow is controlled in accordance with my invention.

I claim:

1. Apparatus comprising a first chamber; a first conduit communicating with the interior of said first chamber; a second chamber disposed to receive gravitational fluid flow from said first chamber; a second conduit communicating with the interior of said first and second chambers; a first automatically actuated valve, in said first conduit; a second automatically actuated valve, in said second conduit; one of said first and second valves being adapted to be closed when the other is open; means for communicating power to said first and second valves to automatically actuate said valves; timing means operatively connected with said power communicating means so as to intermittently terminate and admit access of said power to said first and second valves; continuous pH measuring means in communication with the interior of said second chamber; and control means actuated by said pH measuring means and operatively connected with said power communicating means to control access of power to said first and second valves in response to actuation by said pH measuring means.

2. Apparatus of claim 1 wherein at least a portion of said second conduit is shaped in the form of an inverted U and rotatable about a laterally extending axis passing through the lowermost points of said inverted U, and a vent conduit in an upper wall portion of said inverted U conduit.

3. Apparatus comprising a tank; a first chamber disposed to receive gravitational fluid flow from said tank; a first conduit connecting said tank with said first chamber; a second chamber disposed to receive gravitational fluid flow from said first chamber; means for venting said tank and said first chamber; a second conduit, connecting said first chamber with said second chamber so as to conduct gravitational fluid flow from said first chamber to said second chamber; a first air-pressure operated motor valve, in said first conduit; a second air-pressure operated motor valve, in said second conduit; one of said first and second motor valves being adapted to be closed when the other is open and both said motor valves being maintained in an operating position in response to a single source of air pressure; a third conduit connecting said air pressure source with said first and second motor valves; a valve means comprising not more than two automatically actuated valves in said third conduit; timing means operatively connected with one valve of said valve means so as to cause the last said valve to alternately open and close; a continuous pH measuring means in communication with the interior of said second chamber; and control means actuated by said pH measuring means and operatively connected with one valve of said valve means to maintain same in an operating position in response to actuation by said pH measuring means.

4. Apparatus of claim 3 wherein said valve means in said third conduit consists of a third automatically actuated valve and a fourth automatically actuated valve, and wherein said timing means is operatively connected with said third valve and said control means is operatively connected with said fourth valve.

5. Apparatus of claim 4 wherein said third valve is an air pressure operated valve and said fourth valve is a solenoid valve.

6. Apparatus of claim 3 wherein said first valve is normally closed and said second valve is normally open.

7. Apparatus of claim 3 wherein said second valve is normally closed and said first valve is normally open.

8. Apparatus of claim 5 wherein said solenoid valve is normally open and is moved into a closed position by said control means actuated by said pH measuring means responding to measurement of pH at a value below a predetermined minimum.

9. Apparatus comprising a first chamber; a first conduit communicating with the interior of said first chamber; a second chamber disposed to receive gravitational fluid flow from said first chamber; a second conduit communicating with the interior of said first and second chambers; a first automatically actuated valve, in said first conduit; a second automatically actuated valve, in said second conduit; one of said first and second valves being adapted to be closed when the other is open; means for communicating power to said first and second valves to automatically actuate said valves; and timing means operatively connected with said power communicating means so as to intermittently terminate and admit access of said power to said first and second valves.

10. Apparatus of claim 9 wherein at least a portion of said second conduit is shaped in the form of an inverted U and rotatable about a laterally extending axis passing through the lowermost points of said inverted U, and a vent conduit in an upper wall portion of said inverted U conduit.

References Cited in the file of this patent
UNITED STATES PATENTS

| | | |
|---|---|---|
| 518,238 | Fullner | Apr. 17, 1894 |
| 548,560 | Kremelberg | Oct. 22, 1895 |
| 1,388,613 | Simsohn | Aug. 23, 1921 |
| 1,576,001 | Olden | Mar. 9, 1926 |
| 1,996,233 | Darrah | Apr. 2, 1935 |
| 2,059,145 | Richardson | Oct. 27, 1936 |
| 2,064,799 | Jones | Dec. 15, 1936 |
| 2,287,284 | Behrman | June 23, 1942 |
| 2,290,599 | McChesney | July 21, 1942 |
| 2,377,363 | Noble et al. | June 5, 1945 |
| 2,582,387 | MacNeish | Jan. 15, 1952 |
| 2,631,437 | Bruce | Mar. 17, 1953 |
| 2,656,925 | Johnson | Oct. 27, 1953 |